Jan. 25, 1955    S. F. GORSKE    2,700,442
SPRING CLUTCH MECHANISM
Original Filed Oct. 29, 1947
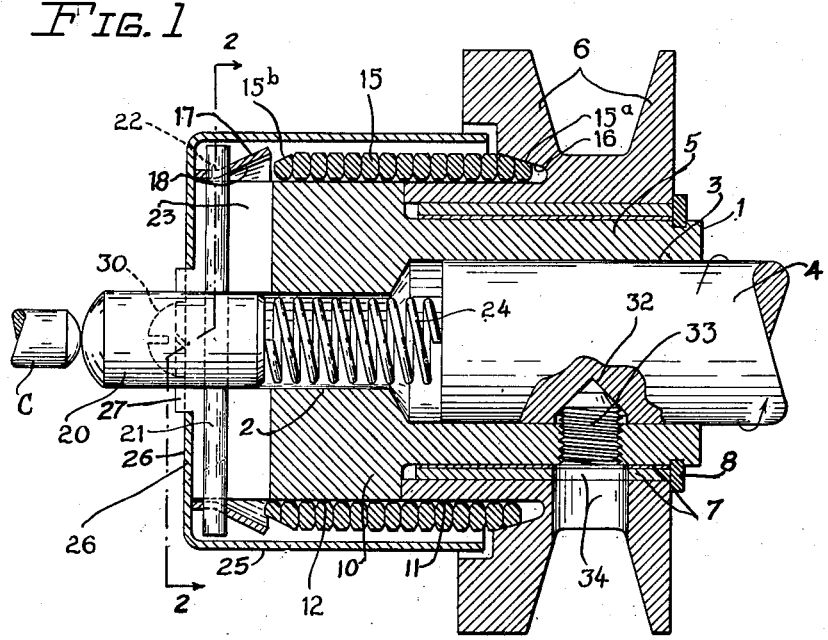
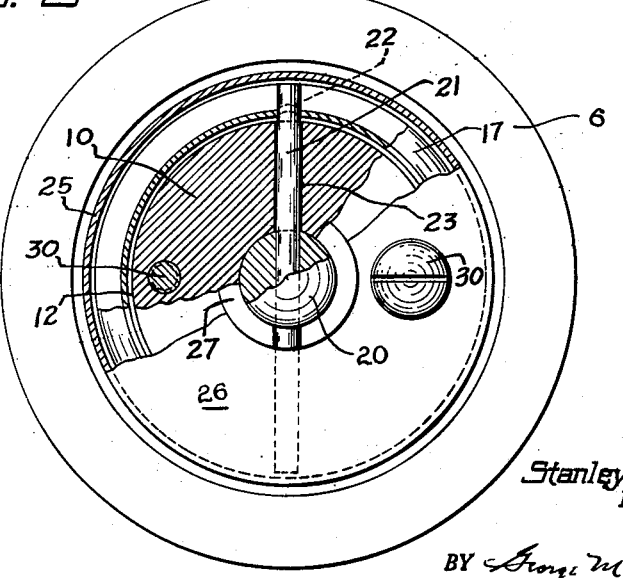
Stanley F. Gorske
INVENTOR.
BY George M. Soule
ATTORNEY

United States Patent Office 2,700,442
Patented Jan. 25, 1955

2,700,442
SPRING CLUTCH MECHANISM

Stanley F. Gorske, Indianapolis, Ind., assignor to The Marquette Metal Products Company, Cleveland, Ohio, a corporation of Ohio Continuation of application Serial No. 782,871, October 29, 1947. This application August 29, 1950, Serial No. 181,990

3 Claims. (Cl. 192—47)

This application is a continuation of my application Serial No. 782,871 filed October 29, 1947 entitled "Overrunning Clutch Unit," which application is being abandoned in favor hereof.

The invention is illustrated by a self-contained one-way-driving helical spring clutch unit shown herewith as adapted for manual actuation into operation, being self-releasing. Units of that type are well known and in every case actuation is secured by movement of a coil at or near a normally free end of the spring (energizing coil) in a manner to cause other coils to wind or expand into locking engagement with cooperating clutch drum or pair of drums.

The objects include provision of: an improved and simple helical spring clutch unit having substantially no frictional resistance to relative angular movement of two rotary members to be coupled by the unit prior to clutch actuation and which is capable of being easily and quickly actuated to couple such rotary members strongly together through the intermediary of the clutch spring; and, specifically a helical spring clutch unit wherein the clutch spring is caused to go into operation by virtue of the direct action of a flexibly movable or floating energizer cone element against an approximately mating conical surface formed on a free end coil portion of the spring whereby to eliminate likelihood of occurrence of "chatter" in case, for example, the conically formed surface of the spring is non-concentric with the associated gripping surface of the spring. Such eccentricity is quite apt to occur in the quantity production of the clutch springs as will be explained.

Subject clutch unit, as illustrated, was designed for use in power lawnmowers, garden tractors and similar light duty power-operated machinery wherein rapid action into and out of operation and low manufacturing and maintenance cost are requisites.

In the accompanying drawing, Fig. 1 is a central longitudinal sectional view of the clutch unit mounted on one end of a power shaft, and Fig. 2 is an end view thereof partly broken away as along the line 2—2 on Fig. 1.

The main body of the clutch unit, as shown, is a shaft adapter 1 of circular cross section having a central axial bore 2 counterbored at 3 to receive a torque transmitting shaft 4, an end portion of which is shown. Radially opposite the counterbore the adapter has a reduced diameter portion 5 forming a journal around the shaft end portion for a wheel 6 which may comprise a pulley adapted for cooperation with a V belt. The pulley has a bearing assembly 7 in the bore of its hub portion (e. g. pressed in) and is retained in free running position on the adapter by a snap ring 8 in the adapter portion 5. Either the shaft 4 or the pulley 6 may be the driving element of the unit.

The adapter 1 has an enlarged diameter or head portion 10 containing the bore 2 and which provides a cylindrical clutch drum surface 12. A coaxial drum surface 11 is formed on a flange or hub portion of the pulley 6. The drum surface portions are of equal diameter and maintained co-adjacent by the snap ring 8 and abutment of the effective drum ends.

The clutch spring 15 as shown has provision for cone clutch energizing action on each of its ends. In such case the spring is cylindrical and the conical clutching surfaces 15a and 15b are formed, preferably by grinding, so that the spring is symmetrical end-for-end. The conical grinding, advantageously, gradually reduces the stiffness of the coils toward the spring ends so that the endmost coils can be easily deflected into contact with respective drum surfaces 11 and 12 for causing contraction of the load carrying or intermediate coils against the drums to drive the load.

In case the clutch spring 15 has such identically formed ends, as described above, the means for connecting one end of the spring to its associated rotary part of the assembly (e. g. right end of spring to pulley 6) then comprises, or may comprise the formation of an internal frusto-conical clutching surface 16 on the pulley as in a suitable axial groove thereof for frictional and wedging mating engagement with the spring end surface 15a when the spring is moved bodily axially to cause such engagement. The only consideration which actually recommends the cone clutch type of coupling at both ends of the spring is the reversibility of the spring end-for-end for assembly into the clutch, the same feature enabling relatively unskilled persons to easily replace the spring in the field.

Practice, since the filing of my application Ser. No. 782,871, has demonstrated that the reversibility feature just discussed is impractical in the absence of inspection measures insuring absolute concentricity of parts, unless essentially a full floating frictional energizing device (subject matter hereof to be explained below) is duplicated at both ends of the spring as, of course, it might be. Instead the spring (at the date of the present application) is being tightly anchored to the pulley 6 or its counterpart by well known means (not shown hereby and not forming the basis for any patent claim hereof).

The principal feature of subject invention, as illustrated by Figs. 1 and 2, comprises or involves the flexibly movable clutch-spring-energizing ring 17 which can conveniently be made as a sheet metal stamping as from tubular stock with a frusto-conical surface 18 approximately mating the frusto-conical surface 15b of the clutch spring. In order to insure clutching action of the ring 17 on the terminal portion of the last coil the included angle of conicity of ring surface 18 is preferably slightly greater than that (15b) of the spring. If the clutch spring is of the expanding-to-grip or "pocket" type (as shown for example in Charles Drexler patent 1,611,898 issued Dec. 28, 1926) then, of course, the counter-part of the flexibly movable energizer ring 17 hereof would have an external frusto-conical clutching surface and the spring an approximately mating internal surface.

The action of the energizer ring 17 on the clutch spring 15 in the particular arrangement shown is one of preventing relative rotation between the associated end coils of the clutch spring and the clutch drum surface 12; and since the ring 17 is also carried by the adapter number 1 which provides that drum surface it is desirable to slidably key the ring 17 onto the adapter so as to prevent relative rotation between ring and adapter about the axis of the adapter while enabling axial shifting of the ring. Cross pin 21 serves as the key and as an important though not specifically essential element of the flexible mounting for the ring 17 on the adapter.

The opposite ends of the cross pin 21 occupy diametrally located openings 22 in the ring 17, and the pin is free to move axially of the clutch in a slot 23 extending diametrally of the adapter 1. The cross pin 21 is connected to an actuator button 20 at a cross hole thereof, and the button is made easily slidable in the center bore 2 of the adapter. In the illustrated inactive condition of the clutch, the button 20 is forced to the left by a compression spring 24 in the center bore 2 reacting against the shaft 4 at one end secured as will be explained. The spring thus normally urges the ring 17 to the left through its mounting pin 21. Clutch actuation is through any suitable means such as partially represented by rod C arranged to shift the button 20 hence the energizer ring 17 to the right by overcoming the force of the spring 20.

The entire actuator assembly described above may be retained in position on the adapter 1 by a cup-shaped metal part 25 which serves as a guard for the clutch spring as is evident. The "bottom" portion 26 of the cup has a central opening fitting a boss portion 27 of the adapter and is also apertured to receive a pair of attaching screws 30 entering the adapter. The adapter 1 may be secured to shaft 4 by a set screw 33 engaging a socket 32 in the shaft and accessible through a radial opening 34 in the pulley.

The flexible mounting for the energizer ring 17 further includes sufficient clearance between it and the adapter portion 10 so that the ring can not only pivot freely about the cross pin 21 for equalization of pressure on the clutch spring in a diametral plane crosswise of the pin 21 but can also move or float bodily a considerable distance transversely of the main or central clutch axis in the common plane of the slot 23 and the cross pin 21 guided by it. Provision for a greater degree of flexibility or floating movement on part of the ring 17 can be effected in various ways (not shown). The only critical thing about the floating mounting for the ring is the provision of enough clearance so that the ring can move laterally and/or tilt sufficiently to enable its inner conical surface to seat all around the end coil or coils of the spring when, due to relative eccentricity of inner and outer spring surfaces (such as is apt to arise from failure to maintain absolute dimensions and relationships in quantity production), the ring could not otherwise have so become seated against the spring.

A helical clutch spring, as one of the most important characteristics recommending the use of spring clutches, requires the retention of only a very small energizing force on its energizing or free end coil or coils in order to insure application of extremely great gripping forces by the intermediate coils. On that account mating conical surfaces on an energizer ring and the spring converging at a fairly narrow angle would seem of itself, an ideal means of securing clutch spring energization, particularly since at the moment of engagement between the coacting cone faces the spring, now loosely surrounding drum surface 12, is free to move laterally and center itself against the conical surface of the energizer ring. Incidentally that is what occurs in the case of the rigidly mounted conical energizer connection 15a, 16 at the opposite end of the spring; and whenever there is no relative eccentricity of parts such as discussed above the matter of retention of sufficient energizing force presents no problem. Study of occasional failures on part of the rigid or non-floating (right-hand) cone clutch connection at 15a, 16 properly to maintain energizing force (evidenced by chatter during actuation and sometimes by chatter during temporary increase in the load being transmitted) led to the revision of the clutch construction already referred to and a more adequate understanding and appreciation of the operation of the flexibly movable actuator ring 17 hereof. The following explanation of the chatter phenomenon appears to be well supported by the many times observed facts given below in connection therewith:

A clutch spring even when made from very heavy and stiff spring stock, cannot be so supported as in a chuck, or on an arbor that forming operations (e. g. grinding) on its end coils will always be accurately accomplished. The finished surface unpredictably presents one or more high spot which may be due to harmonic vibrations of the spring end coils generated during the grinding operation or to other causes. Even though all the spring coils are expanded over an accurately formed and properly supported arbor and the spring has been previously end-ground normal to its axis it is not practicable in quantity production to assure concentricity of the conical surfaces and the associated radially opposite drum-gripping surfaces. If the cost of end-grinding is prohibitive and that operation is therefore omitted then the likelihood of relative eccentricity as discussed above is increased because the end of the spring is more non-symmetrical about its axis.

When the conical end of a clutch spring having a run-out (high spot) is encountered by the approximately mating but laterally fixed conical surface 16 (right end of illustrated clutch), assuming the opposite end of the spring has been properly energized or is solidly anchored to its mating part, the spring will be very rapidly contracted either for its full length, against the drum surfaces 11 and 12 or for as many coils as required in order to produce the necessary load-carrying torque through the contracted coils and their drums. As the load is picked up a sharp rise in torque occurs followed by a drop as the load becomes subjected to running as against static friction. Thus if the spring has been energized by an initial gripping force that is too light to serve at peak torque the energizing grip will be lost and have to be reestablished (following some slippage of the load carrying coils) by a more forcible one which may under the described circumstances not occur until the spring has gone through numerous contracting and expanding cycles evidenced as audible chatter. Persistent chatter in a spring clutch eventually leads to failure of performance for various, generally well understood reasons. It has been my experience that every rigidly mounted type of cone clutch energizer the operation of which I have observed requires more actuating force (in a given size of unit) than does subject floating or flexible, cone clutch energizer mechanism. The reason probably is that no absolute concentricity of parts such as discussed above can be attained except occasionally; and the tendency for chatter and erratic operation to occur must be overcome by increasing the initial holding force between the cone clutch surfaces or between the energizer end coils and the associated drum.

I claim:

1. A spring clutch assembly comprising two coaxial torque-transmitting drums, a clutch spring in telescoping relation to the drums with coils normally out of gripping contact with at least one of them, said coils including a free end coil with a conical peripheral surface, means operative to connect the spring for rotation with the other drum during operation of the clutch, an energizer ring loosely surrounding said one drum and adapted for frictional contact with the associated end of the spring, said ring having a conical surface approximately complementary to the conical surface of the spring for spring-energizing friction contact therewith, and a shiftable pivotal mounting for the ring on said associated drum, the pivotal axis extending diametrally of the drum whereby to enable self-equalizing energizing contact of the ring with diametrally opposite portions of the spring.

2. A spring clutch unit, comprising two relatively rotatable coaxial members one having a clutch drum rigid therewith and an axial center bore, a helical clutch spring with coils surrounding the drum but normally in non-gripping relation thereto, said coils including a free end coil with an external conical surface thereon, means for connecting other coils of the spring to the other member for rotation therewith, and energizing means for the spring comprising a ring loosely surrounding said one member in a manner enabling the ring to move laterally of said member, said ring having a conical internal surface approximately mating the conical surface of the spring, said one member having a diametral slot in the plane of the ring, a cross pin diametrally of said one member loosely occupying the slot and having its ends connected to the ring so as to form a pivot for the ring, and an actuating member connected to the cross pin and guided by the center bore of said one member for axial movement whereby to move the ring axially into or out of engagement with the conical surface of the spring.

3. A self-contained spring clutch assembly unit comprising a rotary member having an axial bore and a counterbore forming a socket for receiving a power shaft, a wheel journalled on said member, said wheel and member having cylindrical clutch drum surfaces, a clutch spring surrounding said surfaces and normally out of contact with the drum surface of said rotary member, an actuator pin slidable in said bore, a compression spring in the bore adapted to act oppositely on the pin and shaft, the rotary member having a cross slot intersecting said bore, a cross pin on the actuator pin occupying the cross slot and movable therein axially of the shaft, and an energizer ring arranged for energizing engagement with the clutch spring, said ring being supported for pivotal movement on opposite ends of the cross pin so that diametrally opposite portions of the ring have self-equalizing, energizing contact with the clutch spring.

References Cited in the file of this patent

UNITED STATES PATENTS

| 459,042 | King et al. | Sept. 8, 1891 |
| 1,501,978 | Webb | July 22, 1924 |
| 1,611,898 | Drexler | Dec. 28, 1926 |
| 2,052,961 | Bonham | Sept. 1, 1936 |